United States Patent [19]

Lagnier

[11] Patent Number: 4,994,126
[45] Date of Patent: Feb. 19, 1991

[54] TREAD FOR PNEUMATIC TIRE INTENDED FOR WINTER DRIVING

[75] Inventor: Alain Lagnier, Romagnat, France

[73] Assignee: Compagnie Generale des Etablissements Michelin-Michelin & Cie, Clermont-Ferrand, France

[21] Appl. No.: 449,579

[22] Filed: Dec. 12, 1989

[30] Foreign Application Priority Data

Jan. 10, 1989 [FR] France ................. 89 00302

[51] Int. Cl.$^5$ ................................................ B60C 11/12
[52] U.S. Cl. ........................... 152/209 R; 152/DIG. 3
[58] Field of Search ........ 152/209 R, DIG. 3, 209 D

[56] References Cited

U.S. PATENT DOCUMENTS

| | | | |
|---|---|---|---|
| 2,264,767 | 12/1941 | Ofensend | 152/209 R |
| 2,538,491 | 1/1951 | Winston | 152/DIG. 3 |
| 3,095,024 | 6/1963 | Robertson | 152/209 R |
| 3,727,661 | 4/1973 | Hoke | 152/209 |
| 3,971,424 | 7/1976 | Boileau | 152/209 R |
| 4,298,046 | 11/1981 | Herbelleau et al. | 152/209 R |
| 4,345,632 | 8/1982 | Takigawa | 152/209 R |
| 4,794,965 | 1/1989 | Lagnier | 152/209 R |

FOREIGN PATENT DOCUMENTS

| | | | |
|---|---|---|---|
| 1163341 | 9/1958 | France | 152/209 R |
| 548914 | 10/1942 | United Kingdom . | |
| 2038729 A | 7/1980 | United Kingdom . | |

Primary Examiner—Michael W. Ball
Assistant Examiner—Mark A. Osele
Attorney, Agent, or Firm—Brumbaugh, Graves, Donohue & Raymond

[57] ABSTRACT

Certain elements in relief (11, 13) of a tread (1) for a radial tire are provided at least with incisions (41, 42, 43) which in cross-section have a fork-shaped outline with at least two branches (41B, 41C) forming an extension of a single part (41A), the number of incisions (41) in the element in relief (11, 13) being multiplied by a factor equal to at least 1.5 starting from the depth ($h_1$) of the double-branched incision (41). Use of such treads for tires intended to travel on wet, snow-covered or icy ground.

8 Claims, 4 Drawing Sheets

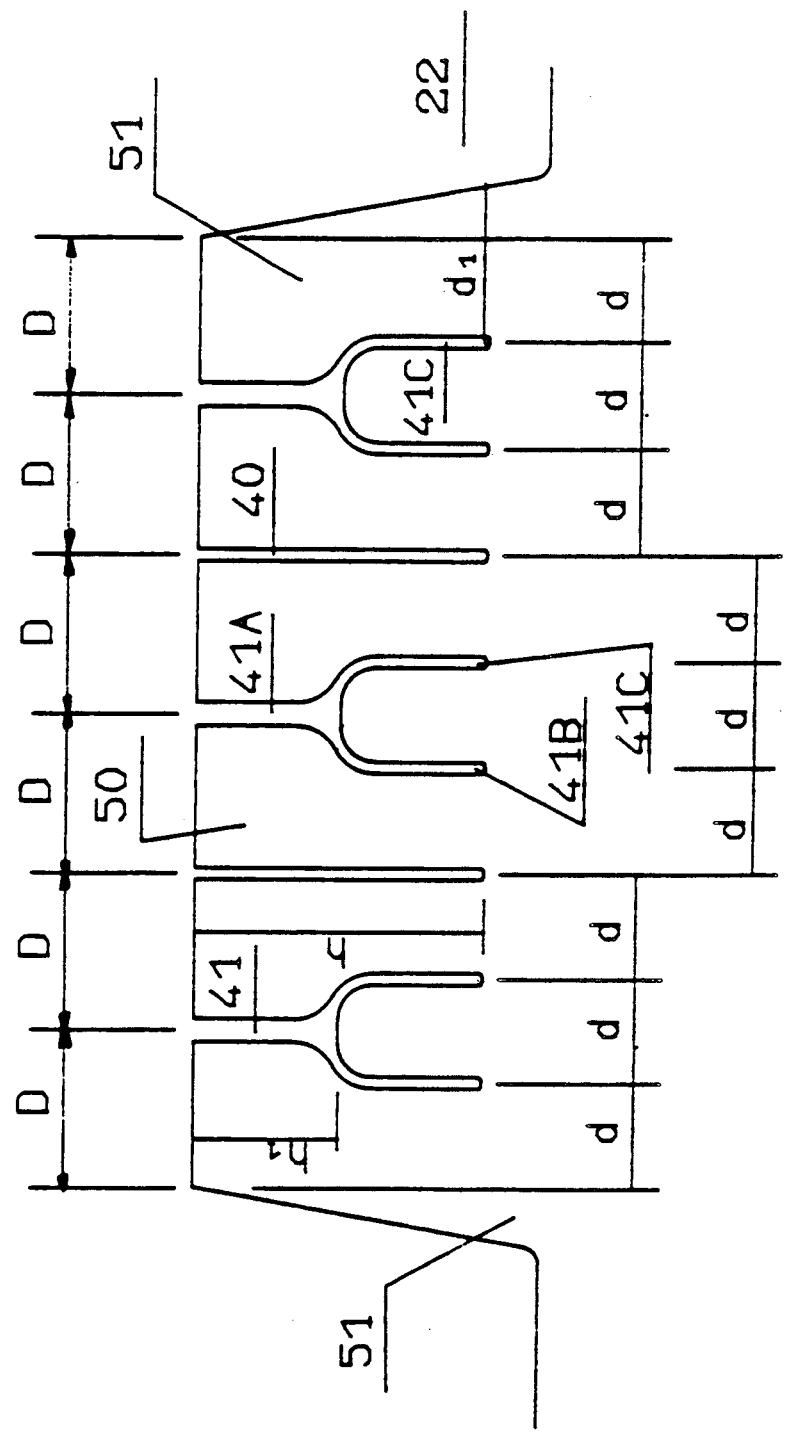

TREAD FOR PNEUMATIC TIRE INTENDED FOR WINTER DRIVING

BACKGROUND OF THE INVENTION

The present invention relates to the tread of a highway tire having a radial carcass reinforcement and a crown reinforcement and, more particularly, to a tread of that type intended for travel on snow-covered, icy or wet ground.

Such a tread is generally formed of elements in relief (ribs or blocks) which are separated from each other in the circumferential direction and/or transverse direction by grooves and have numerous incisions or slits, the width of which, other than zero, is far less than the width of the circumferential and transverse grooves which delimit the elements in relief. The width of an incision is generally variable as a function of the size of tire in question, but is usually between 0.1 mm and 2 mm.

Slits or incisions normal to the surface of the tread can be used. However, the improvement in adherence on snow or ice due to these normal slits disappears during the life of the tread. In order to overcome this problem and thus impart greater effectiveness to the tire, whether upon being driven or upon being braked and whatever the wear of the tread, U.S. Pat. No. 4,298,046 provides the elements in relief in the lateral zones of the tread with incisions of substantially transverse orientation on the tread but inclined with respect to the normal to the surface of the tread by an angle of at most 45° in the direction of rotation of the tire, and provides the elements in relief in the central zone with incisions inclined in the direction opposite the direction of rotation. The described solution imposes a direction of rotation on the tire, the tread of which is provided with such incisions.

In order to eliminate the imposed direction of travel and improve the aspect of the tread upon wear, U.S. Pat. No. 4,794,965 describes a tread comprising blocks having an even number of incisions, these incisions having in cross section, over their entire depth, broken-line contours referred to as "in phase opposition".

In order to impart to the tire the best effectiveness possible for longitudinal adherence on the types of ground in question under driving torque or braking torque, both of the solutions described above employ a large number of incisions and a modification, during travel, of the configuration of the edges delimiting the slices of rubber present between the incisions, the number of edges remaining constant as a function of the rate of wear.

Whatever the radial outline of the incisions, a substantial deficiency in adherence on the types of ground in question appears, beginning at a given rate of wear of the tread of between 30 and 55%. This phenomenon is particularly evident on radial tires, the tread of which is stabilized by a poorly deformable reinforcement.

This deficiency is perceived by the user all the more rapidly the greater the number of incisions on the tread, this number of incisions being then the ground of a high rapidity of wear of the tread, accentuated furthermore by the deliberate selection of radial incision contours causing irregular and self-maintained wear of the rubber slices delimited by the incisions. This rapidity of wear has the result that the rate of wear cited above is reached at the end of a number of miles which is undoubtedly small as compared with the mileage achieved by a normal tire, that is to say, one which is not entirely cut, for the same rate of wear.

The problem forming the basis of the invention is first of all to remedy the lack of adherence on the types of ground in question during the life of the tire, and secondly, to decrease the rapidity of wear of the tread while retaining good adherence of the tire on the types of ground in question.

SUMMARY OF THE INVENTION

The principle of solution in accordance with the invention consists in providing, in part, the tread of the tire with incisions which in cross-section have a fork-shaped outline with at least two branches.

Thus the tread in accordance with the invention has at least elements in relief, ribs and/or blocks, which are separated by circumferential and/or transverse and/or oblique grooves and provided with incisions having, on the surface of the tread, contours of a width (e) other than zero, between 0.4 mm and 1.6 mm. This tread is characterized by the fact that cut elements in relief are provided at least with incisions which in cross-section have an outline formed of a first linear part of a width (e) which extends radially within the tire over a depth of between 35% and 55% of the total depth of the outline, this first part opening into at least two branches or segments of a width (e/2) extending radially within the tire over the remaining depth, the length of an incision having such an outline remaining constant on the surface of the tread as a function of the depth of the outline, and the number of incisions on the element in relief being multiplied by a factor at least equal to 1.5 in order to determine the minimum number of branches or segments leading from the radially inner end of the first linear part of the outline.

The incisions in accordance with the invention can, in cross-section, be of different shapes depending in particular on the multiplication factor of the edges or according to their arrangement on the element in relief.

In the event that the desired multiplication factor of the edges is large, it is advantageous to employ incisions having three branches, one of the branches being the extension of the first part, and the two other branches being arranged on opposite sides of the median plane of the linear part, preferably symmetrically.

If one considers the life of the tire with respect to wear, its adherence on the types of ground considered and its road behavior (cornering ability, stability, noise produced by travel), the best compromise of these performances is obtained by the use of incisions having two branches, these two branches being arranged either on opposite sides of the first linear part of the incision, symmetrically or asymmetrically, or one of the branches being arranged on one side of the median plane of the first part and the other branch being the extension of this first part. The first configuration is advantageous when the incision is not arranged directly close to a groove. On the other hand, in the opposite case, that is to say if the incision is placed close to a groove, the second configuration has the advantage of taking into account the inclination of the wall of the groove and thus of controlling the width of the slice defined by the wall of the groove and the incision.

In the case of so-called double-branch incisions located on opposite sides of the median plane of the first part of the incision, the two branches may have either the general shape of a U or the general shape of a V. In the former case, the two branches have, to a greater part, outlines which are parallel to the outline of the first part and parallel to each other, these parallel outlines being then connected to the outline of the first linear part of the incision by curved connecting portions. In the second case, the two branches are linear and form angles of between 0° and 20° with the median plane of the first part of the incision.

DESCRIPTION OF DRAWINGS

The characteristics and advantages of the present invention will be better understood from the following description, read with reference to the drawings in which embodiments are shown by way of illustration and not of limitation:

FIG. 4 is a detail view, not drawn to scale, of an element in relief seen in cross-section in accordance with an embodiment showing, by way of example, the use of incisions according to FIG. 3A, in combination with normal incisions.

DESCRIPTION OF THE PREFERRED EMBODIMENTS OF THE INVENTION

Figure 1:
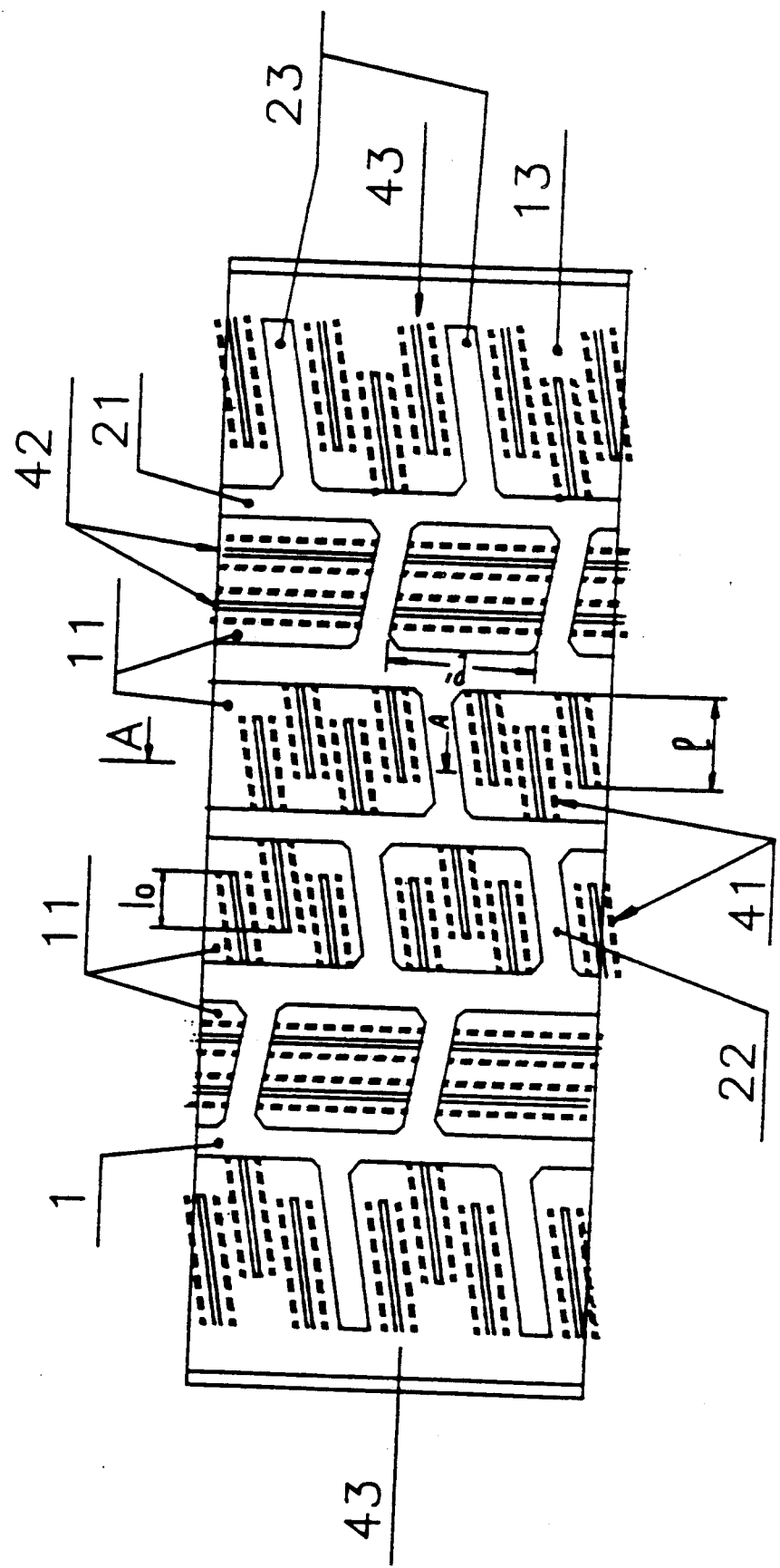
FIG. 1 is a plan view, not drawn to scale, of a tread having incisions in accordance with the invention.

The tread portion 1 of a 175R14X tire, shown in FIG. 1, is provided in its central region with elements in relief, for example, blocks 11 separated from each other by circumferential grooves 21 and transverse grooves 22, the width of which grooves is generally between 3 mm and 7 mm. The side edges of the tread are formed of elements in relief 13 which are separated in circumferential direction by grooves 23.

The blocks 11, 13 are provided with incisions 41, 42, 43 which have linear contours on the surface of the tread 1 with, in each element in relief, orientations substantially parallel to each other. Orientations which differ by an angle of at most 10° are considered to be substantially parallel. The incisions 41 of the elements in relief 11 of the two axially inner central rows are substantially transverse. The same is true of the incisions 43 of the elements in relief 13 on the lateral parts of the tread 1, while the incisions 42 of the elements in relief 11 of the two axially outer central rows are circumferential. The incisions used are of three types: the incisions 41 which commence within the element in relief and debouch only on a single groove and have an axial average length l (i.e., the letter "el"), the incisions 42 debouching on the two substantially parallel grooves delimiting in circumferential direction the element in relief 11 and having an average length l' (i.e., the letter "el"), and the incisions 43 in the elements in relief 13, some of which do not debouch on grooves.

Figure 2:
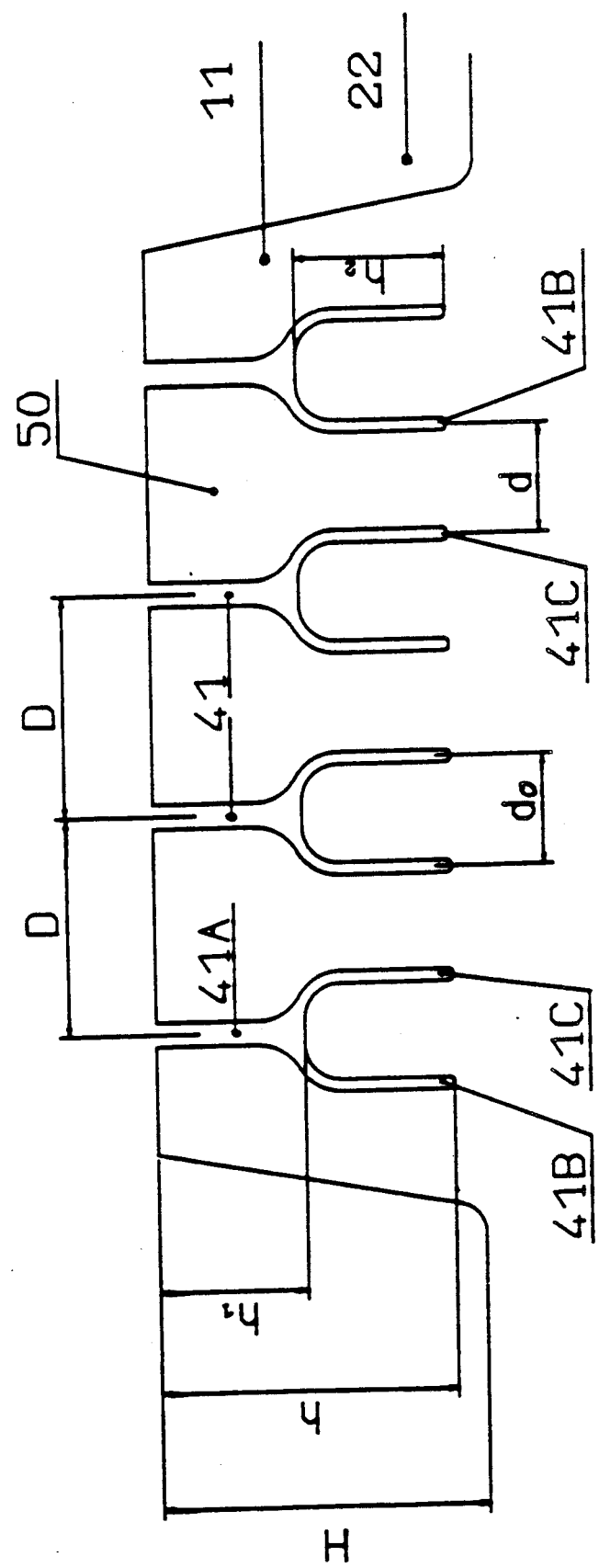
FIG. 2 is a detail view, not drawn to scale, along the section plane indicated by the line AA of FIG. 1.

FIG. 2 shows the respective outlines in cross-section of four incisions 41 of a block 11 of a central row of the tread. These incisions 41 are identical to each other; they have the same depth h which can be between 0.6 H and 1.5 H, H being the depth of the grooves 22 limiting the element in relief 11 in question. Each incision 41 starting from the surface of the tread 1 has a first linear part 41A perpendicular to the surface of the tread and of a width e equal to 0.8 mm. This width e is a function of the size of the tire and, in particular, of the number of incisions 41 present on the surface of the element in relief and is generally between 0.4 and 1.6 mm. The first part 41A extends radially over a depth $h_1$ of between 0.30 and 0.55 h. This linear part is extended by two branches or segments 41B, 41C of a width of 0.4 mm, that is to say of a width e/2, which extend radially over a depth $h_2$, complement of $h_1$ to give the total height h of the incision.

These incisions 41 are separated on the surface of the element in relief 11 by a distance D measured between the axes of two neighboring incisions and are arranged on the element in relief in such a manner that the distance $d_0$ between the two branches of an incision is equal, on the one hand, to the distance d separating a branch 41C of an incision 41 from the branch 41B of the neighboring incision and, on the other hand, to one-half of the distance D.

As clearly shown in FIG. 2, the invention in this case makes it possible to multiply by 2 the number of edges of the slice 50 starting from the depth $h_1$, which is equal to 45% of the depth h. This multiplication of the number of edges makes it possible to compensate for the defect in adherence on the types of grounds in question which would have been present in the case of a tire the blocks of the tread of which were provided with straight incisions defining slices of width D, the cause of which defect is the loss of mobility of the rubber slices, the mobility of a slice being furthermore less the smaller its height.

FIG. 2 also makes it possible to understand another advantage of the invention. By use of incisions in accordance with the invention the shape of a slice of rubber 50 defined by two neighboring incisions 41 is such that the anchoring area of the slice 50 at its base (i.e., at the level of the radially inner ends of the incisions), namely the product of the distance d multiplied by the length $l_0$ (FIG. 1) over which the two neighboring incisions 41 face each other, is clearly smaller than the area of the slice in contact with the ground, namely, the product of the distance D multiplied by the same length $l_0$. In the case shown, this contact area is equal to twice the anchoring area. This particular form combined with a width e of incision other than zero confers upon the slice 50 a mobility which is far superior to the mobility which would be possessed by a normal slice defined by two incisions which are linear over the entire depth and accordingly an effectiveness of the edges on the ground which is considered superior. The invention thus makes it possible to decrease the number of incisions on the surface of the tread for a given level of adherence and, accordingly, a substantial decrease in the rate of wear of the slices 50 to the depth $h_1$. Thus a tire whose tread is provided with blocks all having five incisions of a width of 0.4 mm, the outline of each incision being linear and perpendicular to the surface of the tread over the entire depth h may be advantageously replaced by a tire which is fully identical to the preceding one except that the blocks are provided with three incisions in accordance with the invention of a width of 0.8 mm, the height $h_1$ being equal to 45% of the height h.

The longitudinal adherence and wear tests carried out on a vehicle (four identical tires) show a loss of adherence of about 5%, which loss is deemed insignificant as a function of the dispersion inherent in such global tests (measurement of the stopping distance of a vehicle, the four wheels being locked), while the increase in wear, measured by the loss of weight in grams per km, amounts to about 13% on the average on the driving tires, that is to say, the tires which are most sensitive to wear.

Figure 3D:
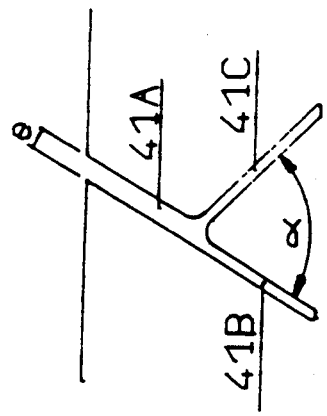
FIGS. 3A, 3B, 3C, and 3D are detail views on a larger size in cross-section of incisions in accordance with the invention.
Figure 3B:
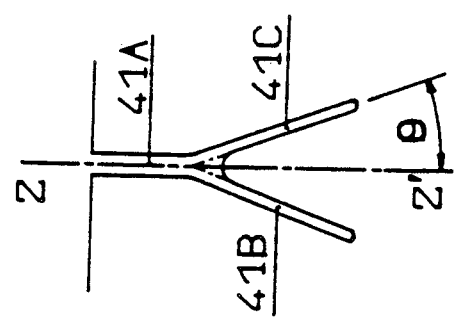
Figure 3C:
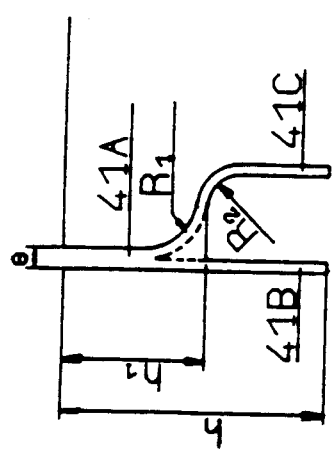
Figure 3A:
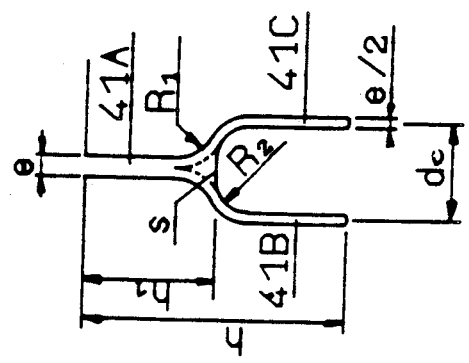

FIG. 3A is a detailed view of an incision used in the block of FIG. 2. The incision 41 has two branches 41B, 41C which form an extension in the form of an inverted U of the first linear part 41A. The U-shape, in itself, as well as the manner of connection of the two branches 41B, 41C to the single part 41A may be variable, more particularly as a function of the manner of obtaining metal inserts which, anchored in the vulcanization mold, will, by molding, form the incisions in the tread.

If these inserts are obtained by molding, injection or machining, the inner base of the U has the shape of a half circle of radius R at most equal to 1.5 mm, the distance $d_0$ between the two branches 41B, 41C being at most equal to 3 mm in order to facilitate the removal of the tire from the baking mold. This base may also be formed of two quarter circles of radius $R_2$, smaller than R, connected by a straight line segment S.

If these inserts are obtained by assembly of two shaped metal parts, the inner base of the U is then pointed (dotted lines of FIG. 3A.)

As to the form of connection of the outer walls of the insert, it has the shape of a circular arc of radius $R_1$, at least equal to 1.5 times the width e/2.

FIG. 3B is a possible variant of an incision in accordance with the invention, characterized by the fact that the two branches 41B and 41C are linear, symmetrical with respect to the median plane ZZ' of the first linear part 41A and form with this median plane an angle $\theta$ of at most 20°. As a result of the inclination of the two branches 41B and 41C, this type of incision makes it possible, starting from the height $h_1$, to cause irregular wear of the slices of rubber and accordingly to increase, if necessary, the effectiveness of the edges of the slices on the types of ground in question. As shown in FIGS. 3C and 3D, incisions having only two branches can be such that one of the branches 41B, 41C is the linear extension of the first part 41A. In the case of FIG. 3D, in which the two branches 41B, 41C form a V, the angle $\alpha$ formed by these two branches is at most 40°.

Although the invention fundamentally concerns incisions having at least two branches starting from a certain depth, one will not be going beyond the scope of the invention by using such incisions associated with other incisions of different type either on one and the same element in relief or on different elements as a function of their position on the tread. On the same element in relief the incisions in accordance with the invention can be combined, for instance, with simple linear incisions, as shown in FIG. 4. Such a combination is formed of three incisions 41 in accordance with the invention and two linear incisions 40 over the entire depth, common to the five incisions. Such a solution, makes it possible, while obtaining a distance d between incisions at their base which is constant and equal in this case to 2D/3, to make the distance $d_1$ between the wall of a delimiting groove 22 and the incision 41C closest to this groove little different from d. The two slices 51 then have a mobility comparable to the slices 50 between two neighboring incisions, resulting in more uniform wear, when the number of incisions has become greater (8 instead of 5).

In the same way, the relief elements of the edges of the tread will be provided with incisions either in accordance with the invention or inclined linear incisions while the elements in relief in the center of the tread are provided with either inclined and linear incisions or incisions in accord with the invention, the choice as to the combination being guided by the adherence desired, either improved adherence under driving torque or improved adherence under braking torque.

I claim:

1. A tread for a tire with radial carcass reinforcements surmounted by a tread reinforcement, more particularly intended for travel on wet, snow-covered or icy ground, formed at least of elements in relief separated by grooves and provided with incisions, having on the surface of the tread, a contour of a width (e) of between 0.4 and 1.6 mm, characterized by the fact that cut elements in relief (11, 13) are provided at least with some incisions (41, 42, 43) having in cross-section an outline formed of a first linear part (41A) of width (e) extending radially inwardly from the tread surface a depth ($h_1$) of between 35% and 55% of the total depth (h) of the outline, this first part (41A) opening into at least two branches or segments (41B, 41C) of a width (e/2) half that of the first linear part extending radially inward over the remaining depth (h−$h_1$) of the outline, the length (l, l') of an incision (41, 42, 43) on the surface of the tread 1 remaining constant as a function of the depth (h) of the outline, the number of incisions on the element in relief (11, 13) being multiplied by a factor at least equal to 1.5, in order to determine the minimum number of branches or segments leading from the depth ($h_1$) to the final depth of the outline (h).

2. A tread according to claim 1, characterized by the fact that the cut elements in relief (11, 13) have only double-branch incisions (41), the distance ($d_0$) between the two branches (41B, 41C) of an incision (41) being, on the one hand, equal to the distance (d) between the branch (41C) of one incision (41) and the branch (41B) of the neighboring incision (41), and, on the other hand, equal to one half of the distance (D) between two neighboring incisions (41A) on the surface of the tread (1).

3. A tread according to claim 1, characterized by the fact that the cut elements in relief (11, 13) have double-branch incisions (41) and linear incisions (40), these incisions (40, 41) being arranged on the element in relief (11, 13) in such a manner that the distance (d) between the incisions (41B, 41C, 40) extending radially inwardly from the depth ($h_1$) to the final depth of the outline (h), is equal to two-thirds of the distance (D) between the incisions (41A and 40) on the surface of the tread (1).

4. A tread according to claim 1, characterized by the fact that the incisions (41) have two branches (41B, 41C) parallel to the first linear part (41A) and arranged symmetrically on both sides of the median plane (P) of the first linear part (41A), the branches being connected to said first linear part (41A) by curved connecting portions.

5. A tread according to claim 1, characterized by the fact that the incisions (41) have two linear branches (41B, 41C) arranged symmetrically on both sides of the median plane (P) of the first linear part (41A), each branch forming an angle $\theta$ of at most 20° with said plane (P).

6. A tread according to claim 1, characterized by the fact that the incisions (41) have two branches (41B, 41C), one of the branches (41B, 41C) being the linear extension of the first linear part (41A), the other branch (41B, 41C) being parallel to the first linear part (41A) and connected to it by curved connecting portions.

7. A tread according to claim 1, characterized by the fact that the incisions (41) have two branches (41B, 41C), one of the branches being the linear extension of the first linear part, the other branch forming an angle $\alpha$ of at most 40° with the linear extension.

8. A tire characterized by the fact that it has a tread according to one of claims 1 to 7.

* * * * *